US007925420B2

(12) United States Patent
Forte et al.

(10) Patent No.: US 7,925,420 B2
(45) Date of Patent: Apr. 12, 2011

(54) METHOD AND DEVICE FOR THE DETERMINATION AND INPUT OF FUEL INTO AN INTERNAL COMBUSTION ENGINE ON THE BASIS OF AN AIR-FUEL RATIO TARGET AND IONIC CURRENT SENSOR

(75) Inventors: Pasquale Forte, Orsenigo (IT); Stefano Bordegnoni, Orsenigo (IT); Andrea Gelmetti, Orsenigo (IT)

(73) Assignee: Eldor Corporation, S.p.A., Orsenigo (IT)

( * ) Notice: Subject to any disclaimer, the term of this patent is extended or adjusted under 35 U.S.C. 154(b) by 246 days.

(21) Appl. No.: 12/083,423

(22) PCT Filed: Jul. 27, 2006

(86) PCT No.: PCT/EP2006/007440
§ 371 (c)(1),
(2), (4) Date: Jul. 22, 2008

(87) PCT Pub. No.: WO2007/042091
PCT Pub. Date: Apr. 19, 2007

(65) Prior Publication Data

US 2009/0125210 A1 May 14, 2009

(30) Foreign Application Priority Data

Oct. 11, 2005 (IT) .............................. MI2005A1906
Oct. 18, 2005 (IT) .............................. MI2005A1960

(51) Int. Cl.
*B60T 7/12* (2006.01)

(52) U.S. Cl. ......................... 701/104; 123/674; 123/681
(58) Field of Classification Search .......... 701/103-105, 701/114, 115; 123/434, 435, 673, 674, 679, 123/681-684, 687, 696
See application file for complete search history.

(56) References Cited

U.S. PATENT DOCUMENTS 4,185,604 A * 1/1980 Nagaishi et al. ............. 123/536
4,380,986 A 4/1983 Latsch et al.
4,964,388 A 10/1990 Lefebvre
5,755,206 A 5/1998 Takahashi et al.
(Continued)

FOREIGN PATENT DOCUMENTS

DE 196 47 161 A1 12/1997
(Continued)

OTHER PUBLICATIONS

Hellring, M. et al., "Robust AFR Estimation Using the Ion Current and Neural Networks", SAE Technical Paper Series, Society of Automotive Engineers, Warrendale, PA, US, Mar. 1-4, 1999, pp. 1-5.

*Primary Examiner* — John T Kwon
(74) *Attorney, Agent, or Firm* — Greer, Burns & Crain, Ltd.

(57) ABSTRACT

Methods and devices for determining and putting in fuel into an internal combustion engine on the basis of an air-fuel ratio in proximity to the stechiometric value, based on the use of the ion current released by a device, positioned on each cylinder of said engine. This ion current is acquired by a Control Unit equipped by means, preferably electronic ones, which implement the invention, repeated continually for each engine cycle and for each cylinder, characterized in that the method develops over various phases.

2 Claims, 8 Drawing Sheets

U.S. PATENT DOCUMENTS

| | | | | |
|---|---|---|---|---|
| 5,904,127 | A | 5/1999 | Kemmler et al. | |
| 6,237,327 | B1 * | 5/2001 | Nishimura et al. | 60/276 |
| 6,295,862 | B1 * | 10/2001 | Kurokawa et al. | 73/31.05 |
| 6,442,998 | B2 * | 9/2002 | Kurokawa et al. | 73/31.05 |
| 6,576,118 | B2 * | 6/2003 | Ohkuma | 205/784.5 |
| 6,708,681 | B2 * | 3/2004 | Hosoya et al. | 123/681 |
| 2005/0173265 | A1 * | 8/2005 | Stahl | 205/783.5 |

FOREIGN PATENT DOCUMENTS

| | | | |
|---|---|---|---|
| DE | 197 57 893 | A1 | 7/1999 |
| DE | 199 16 205 | C1 | 11/2000 |
| EP | 0297 951 | A1 | 1/1989 |
| EP | 0837 233 | A2 | 4/1998 |
| WO | WO 98/37322 | | 8/1998 |
| WO | WO 00/61932 | | 10/2000 |

* cited by examiner

METHOD AND DEVICE FOR THE DETERMINATION AND INPUT OF FUEL INTO AN INTERNAL COMBUSTION ENGINE ON THE BASIS OF AN AIR-FUEL RATIO TARGET AND IONIC CURRENT SENSOR

TECHNICAL FIELD

The present invention relates to a method and the respective devices for determining the air-fuel ratio and continually putting in a quantity of fuel, on the basis of a target value in proximity to the stoichiometric value, into each cylinder of an indirect-injection internal combustion engine, controlled by a Control Unit.

BACKGROUND ART

As it is known, to optimise the combustion process in cylinder(s) in an internal combustion engine it is necessary to maintain the air-fuel ratio in each cylinder, as much as possible, in proximity to the stoichiometric value.

The devices and methods currently utilized and available in the market for measuring said air-fuel ratio are based on oxygen sensors, usually housed in the outlet conduit in proximity to the catalytic converter. However, these sensors present certain drawbacks. These sensors, for example, are subject to breakage and are not able to effectuate measurements in each engine cylinder.

DISCLOSURE OF INVENTION

The aim of the present invention is to identify a method and the respective devices for determining the air-fuel ratio of an indirect-injection internal combustion engine to continually put in a quantity of fuel into each cylinder on the basis of a target value, in proximity to the stoichiometric value, eliminating the oxygen sensors to overcome the drawbacks described.

The present invention is based on the use of the ion current released by a device, positioned on each cylinder of said engine, comprising a coil, a spark plug, a polarisation circuit, an acquisition circuit. This ion current is acquired by a Control Unit, commonly utilized for the operation of said combustion engines. Said Control Unit is equipped with means, preferably electronic ones, which implement the method of the present invention. Said method, repeated continually, for each cycle of said combustion engine and for each cylinder, is characterized in that said method develops over various phases of: (a) measurement of the ion current of the combustion of the air-fuel mixture, released by aforesaid device, from the beginning of the spark occurring in the spark plug present in said device, through to the end of the ion phenomenon; (b) registration of the various ion current values during the combustion of the air-fuel mixture, preferably being registered the values of the chemical and thermal phase, and/or the values of the maximum peaks of the chemical phase of said ion current; (c) determination of the value of the air-fuel ratio present in each cylinder on the basis of the ion current values that were registered; (d) registration of said value of the air-fuel ratio present in each cylinder of said engine on the basis of the current released by aforesaid device; (e) determination of the value of the air-fuel ratio target for said combustion engine on the basis of the registered value of the air-fuel ratio present in each cylinder and other reference values; (f) registration of said value of the air-fuel ratio target; (g) input of a quantity of fuel into each cylinder of said engine on the basis of said registered value of the air-fuel ratio target.

The aim and advantages of the present invention will be better explained in the following description and embodiments of the invention, giving by way of non-limiting examples and in the drawings enclosed, in which.

Figure 1:
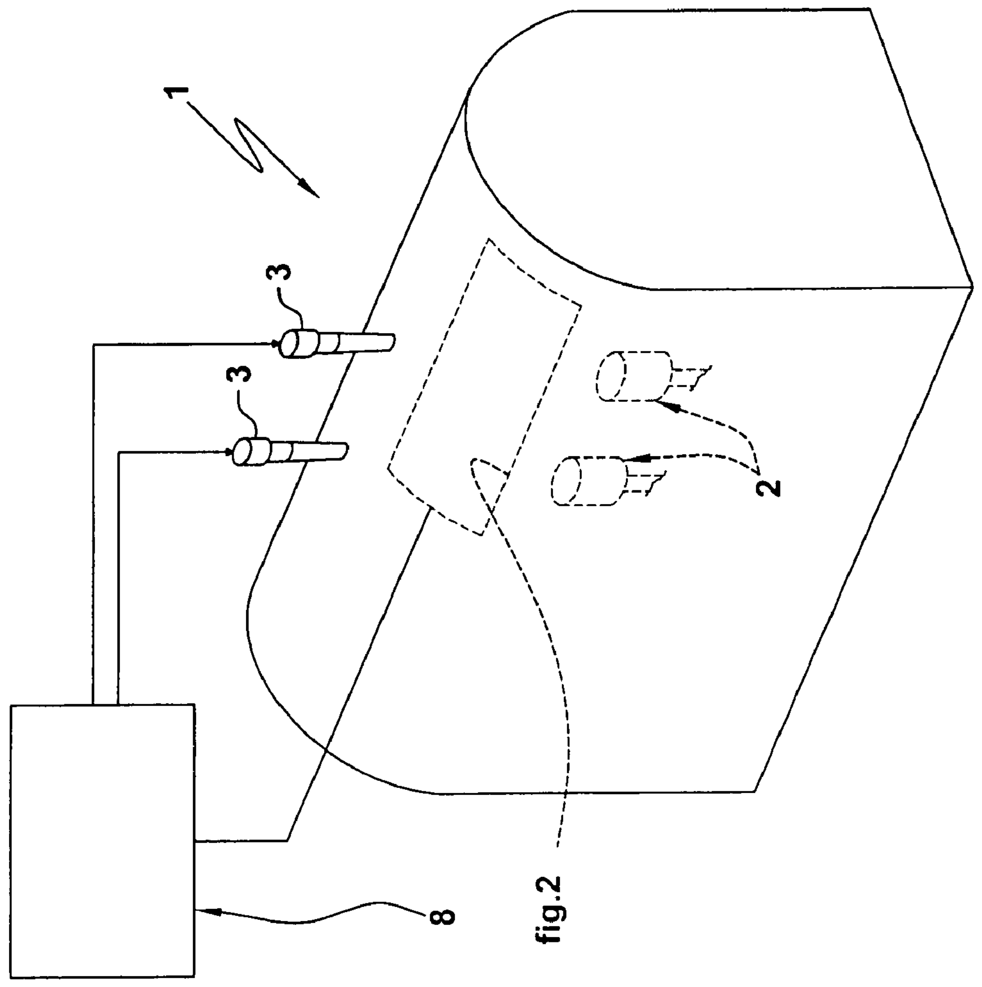
FIG. 1 illustrates a schematic view of the engine which utilises the method and the Control Unit in which the means that implement the present invention are housed.

With reference to FIG. 1, (1) indicates an internal combustion engine as a whole, inside of which there are the cylinders (2) into which the fuel has put in by the injectors (3) on the basis of the instructions, determined according to the method and the respective means of the present invention, received by a Control Unit, also called CPU (8).

Figure 2:
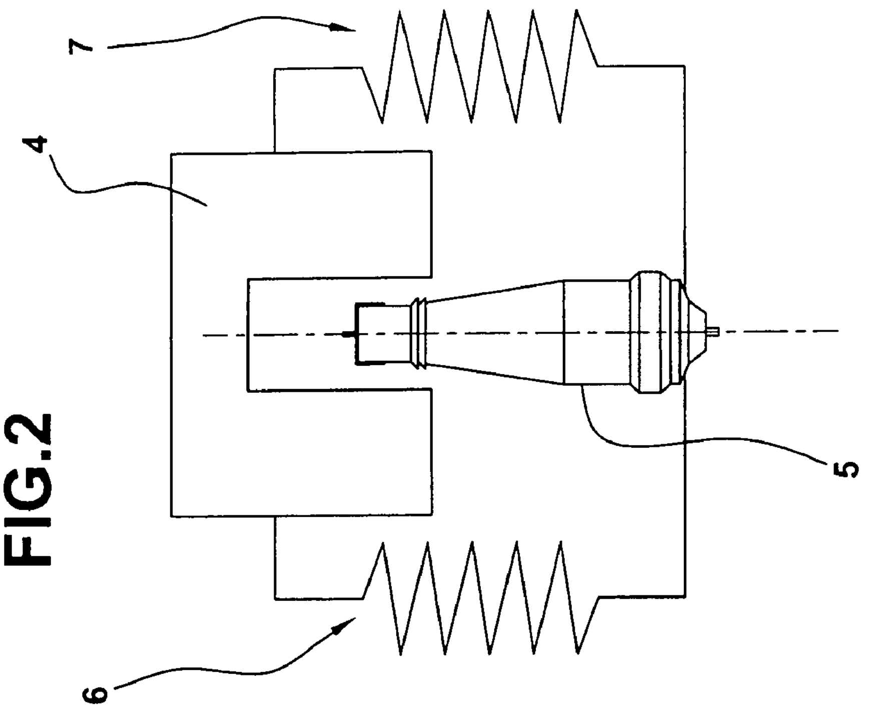
FIG. 2 illustrates a schematic view of the device positioned on the top of each cylinder of the engine according to the present invention.

With reference to FIG. 2, said figure shows the part of the device subject of the invention, positioned on the top of the cylinders, which, in addition to creating the spark necessary to realise the combustion inside the cylinder, produces the ion current, indispensable for implementing the method which is the subject of the invention. This part of the device consists of a coil (4) and a spark plug (5).

These two elements (4) and (5) are mutually connected by a polarisation circuit (6) and an acquisition circuit (7).

Figure 3:
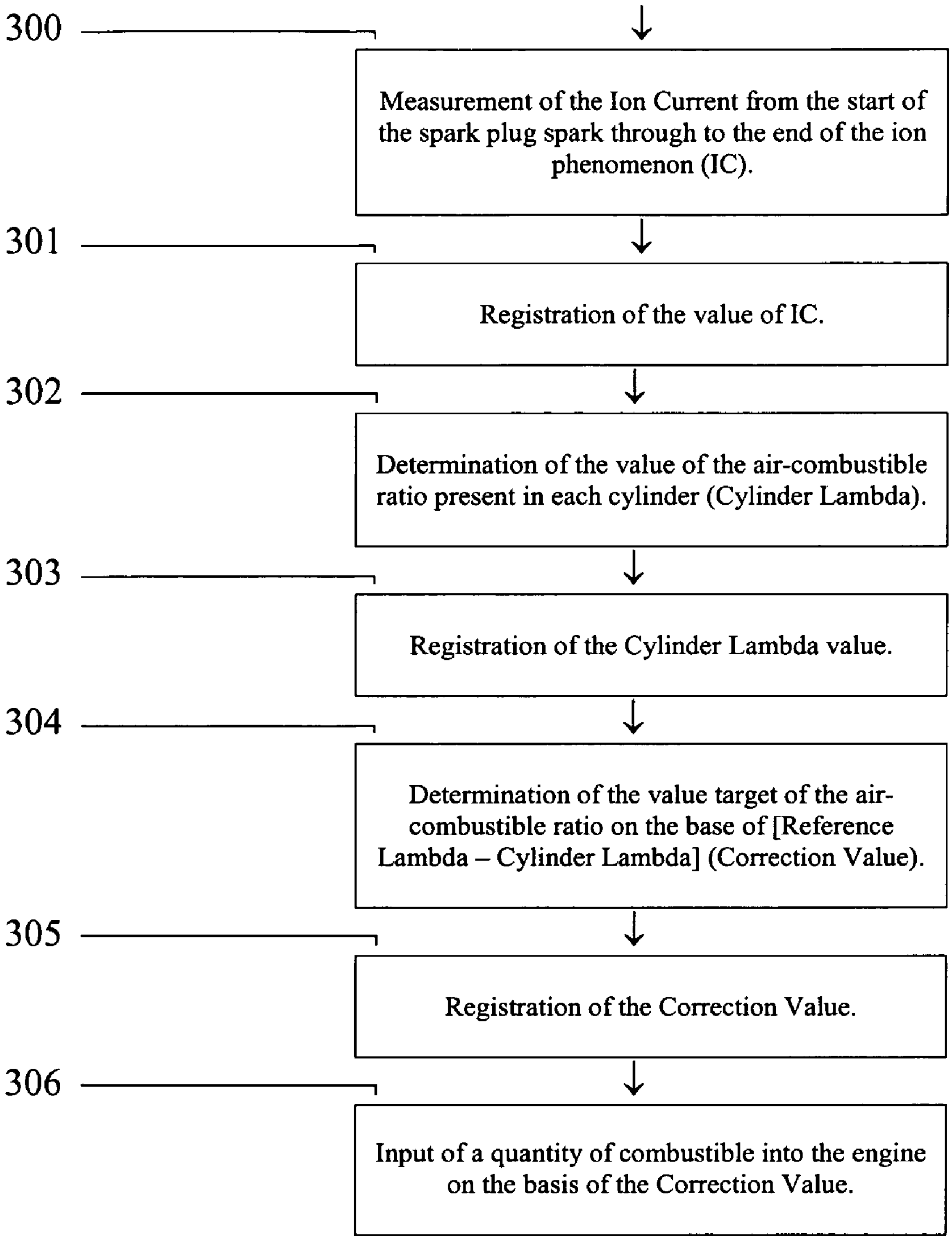
FIG. 3 illustrates, schematically, the flow chart relating to the method according to the present invention.

With reference to FIG. 3, said figure indicates a flow chart which schematically illustrates the method which is subject of the invention.

This method develops over various phases, repeated for each cycle of the engine (1) and to which are the respective means, said means, as mentioned earlier, being preferably electronic. In a first phase (300) the measurement is effectuated, for each cycle of the engine, from the beginning of the spark occurring in the spark plug (5) through to the end of the ion phenomenon of the ion current present in at least one of the cylinders (2) by the circuits (6) and (7), combined with the coil (4) and the spark plug (5), being said current present solely in the cylinder or cylinders where the combustion has occurred. After measuring said ion current (IC), there is a second phase (301) of registration of the value of said ion current IC. The subsequent phase (302) relates to the determination of the value of the air-fuel ratio present in each cylinder (Cylinder Lambda). This value is determined on the basis of the value of said ion current IC present in each cylinder (2), considering that said ion current IC is present in one or more cylinders, depending on the number of the cylinders of the engine (1) where the combustion has occurred. The subsequent phase (303) relates to the registration of said Cylinder Lambda value. This phase is followed by the phase (304) in which the target value of the air-fuel ratio is determined, said value constituting the correction value of the fuel coefficient (Correction Value), which varies depending of the various engine typologies and on the manufacturers. Said Correction Value is determined in the present phase 304 on the basis of the difference between said Cylinder Lambda value, registered in the previous phase 303, and a predetermined value of the air-fuel ratio (Reference Lambda), preferably stored in the Control Unit (8). Said Correction Value is then registered in the subsequent phase (305). Finally, the method envisages a further phase (306) of putting in of a quantity of fuel into the cylinders (2) by the injectors (3) on the basis of said Correction Value, determined in the previous phase 304.

Figure 4:
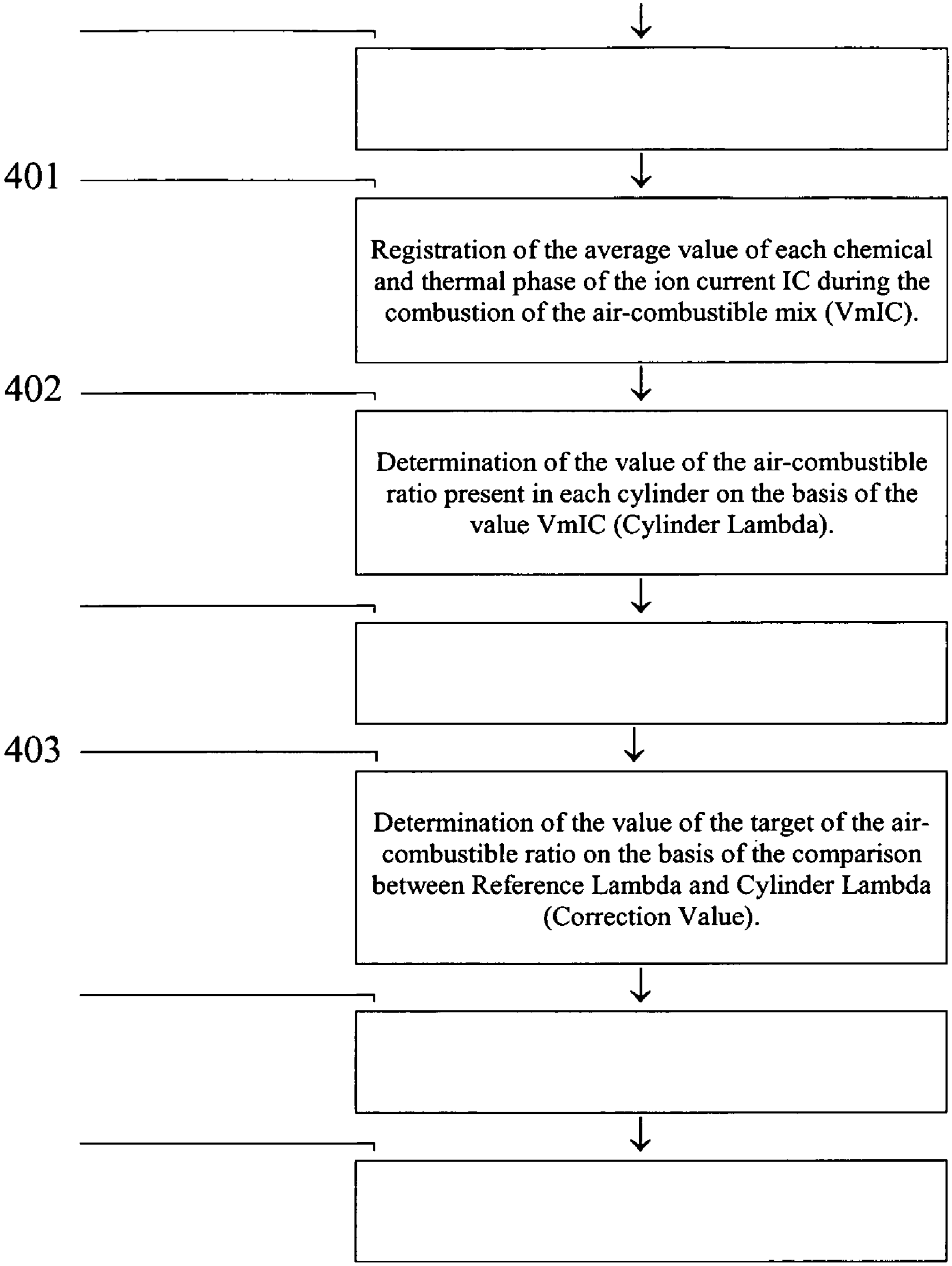
FIGS. 4-9 illustrate other flow charts according to embodiments of the method according to the present invention.

With reference to FIG. 4, said figure indicates a flow chart which schematically illustrates the method according to one embodiment.

The present embodiment shifts from the method illustrated in FIG. 3 in relation to the phases: (401), regarding the ion current values that are registered; (402), regarding the determination of the value of the air-fuel ratio present in each cylinder (2) of said engine (1); (403), relating to the determination of said Correction Value. In relation to said phases, the invention envisages the respective means therefor.

In this embodiment phase 401, the registration of the values of said ion current IC, registers the average value of each chemical and thermal phase of said ion current IC during the combustion of the air-fuel mixture (VmIC) in each cylinder (2). After said value VmIC has been registered, the subsequent phase 402, the determination of said Cylinder Lambda value, is realised on the basis of said value VmIC, registered in the previous phase 401, being said value VmIC is correlated to said Cylinder Lambda value. Subsequent phase 403, the determination of said Correction Value, is determined by comparing the Cylinder Lambda value, registered in phase 402, with the Reference Lambda value, preferably stored in the Control Unit (8).

Figure 5:
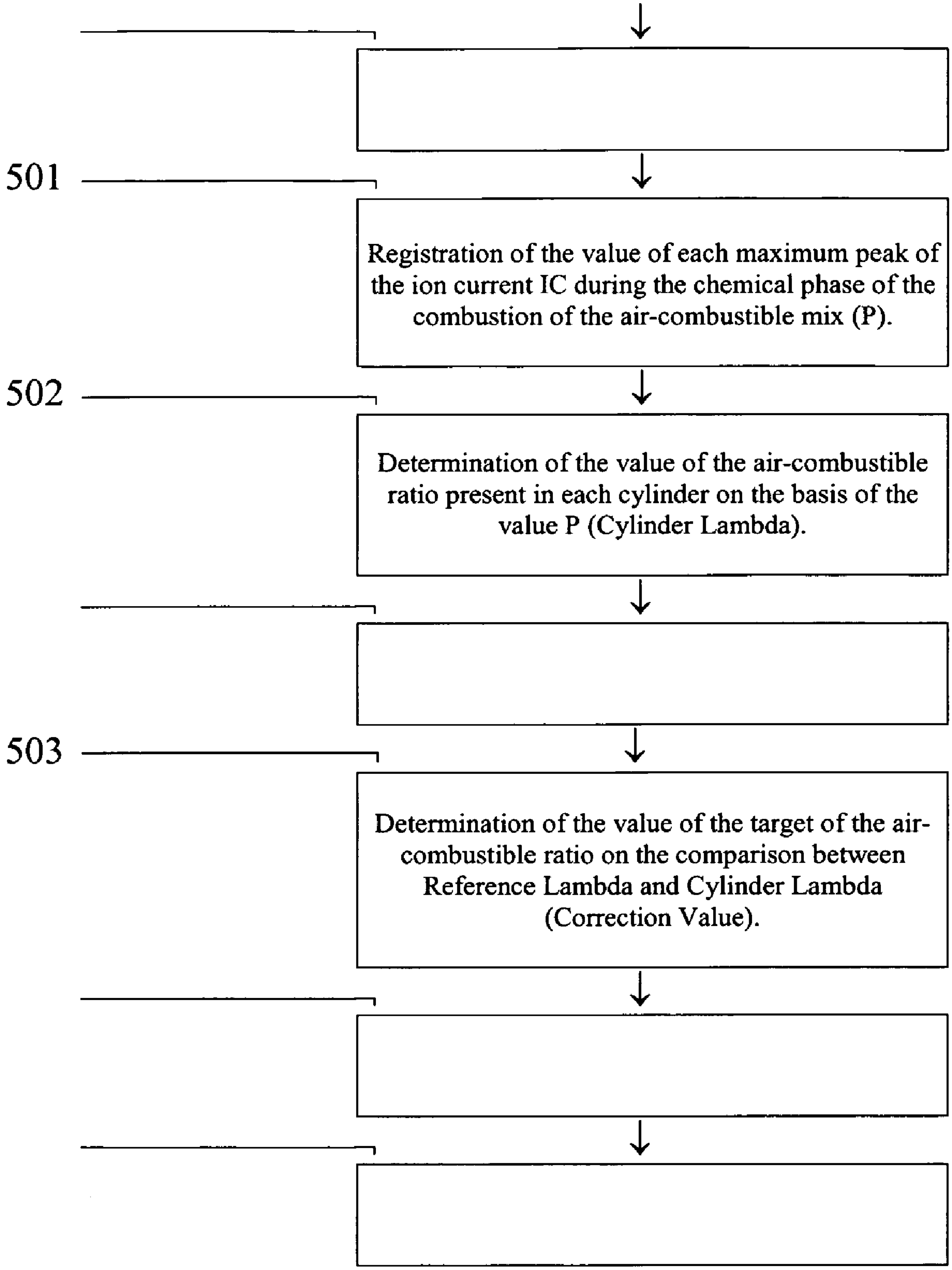

With reference to FIG. 5, said figure indicates a flow chart which schematically illustrates a further embodiment.

The present embodiment shifts from the method illustrated in FIG. 3 in the phases: (501), regarding the ion current values registered; (502), regarding the determination of the value of the air-fuel ratio present in each cylinder of the engine; (503), regarding the determination of the Correction Value. In relation to said phases, the invention envisages the respective means therefor. The ion current values IC registered in this embodiment in phase 501 are related to the value of each maximum peak of the ion current IC during each chemical phase of the combustion of the air-fuel mixture in each cylinder (P). After said maximum peak value P has been registered, the subsequent phase 502, regarding the determination of the Cylinder Lambda value, occurs, in this embodiment, on the basis of the value P, registered in the previous phase 501 being said value P is correlated to said Cylinder Lambda value. Subsequent phase 503, regarding the determination of said Correction Value, in this embodiment, is determined by comparing the Cylinder Lambda value, registered in phase 502, with said Reference Lambda value, preferably stored in the Control Unit (8).

Figure 6:
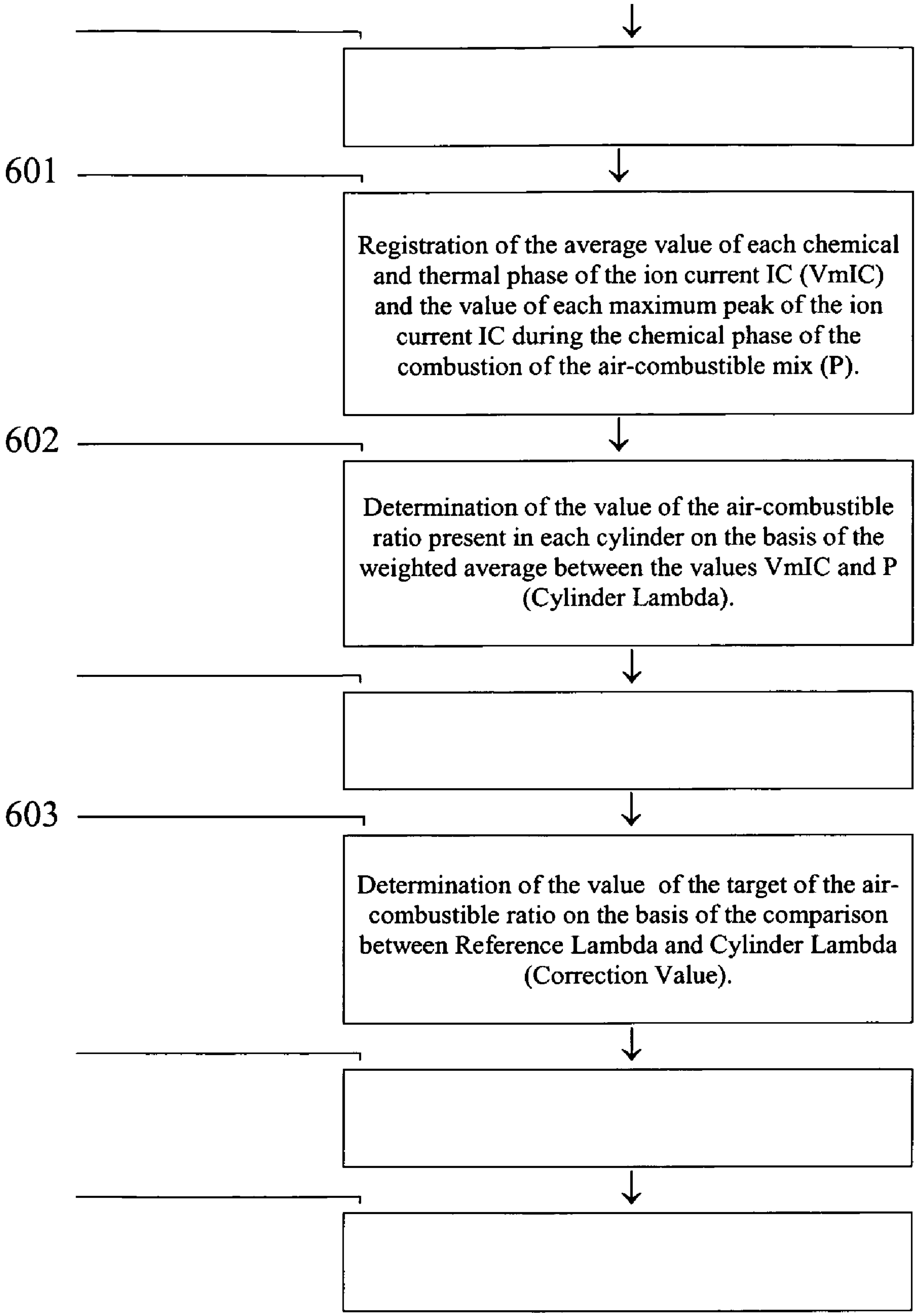

With reference to FIG. 6, said figure indicates a flow chart which schematically illustrates a further embodiment.

The present embodiment shifts from the method illustrated in FIG. 3 in the phases: (601), regarding the registered values of the ion current; (602), regarding the determination of the value of the air-fuel ratio present in each cylinder of said engine; (603) regarding the determination of said Correction Value. In relation to all said phases, the invention envisages the respective means therefor.

The ion current values registered in this embodiment in phase 601 are related to: i) the average value of each chemical and thermal phase of said ion current IC during the combustion of the air-fuel mixture (VmIC) in each cylinder (2); ii) the value of each maximum peak of said ion current IC during each chemical phase of the combustion of the air-fuel mixture (P) in each cylinder.

After said average value VmIC and said value P have been registered, the phase subsequent 602, regarding the determination of the Cylinder Lambda value, occurs, in this embodiment, on the basis of the value of the weighted average between said average value VmIC and said value P, registered in the previous phase 601, being said value of the weighted average between said average value VmIC and said value P is correlated to said Cylinder Lambda value. Subsequent phase 603, regarding the determination of said Correction Value, in this embodiment, is determined by comparing the Cylinder Lambda value, registered in phase 602, with said Reference Lambda value, preferably stored in the Control Unit (8).

Figure 7:
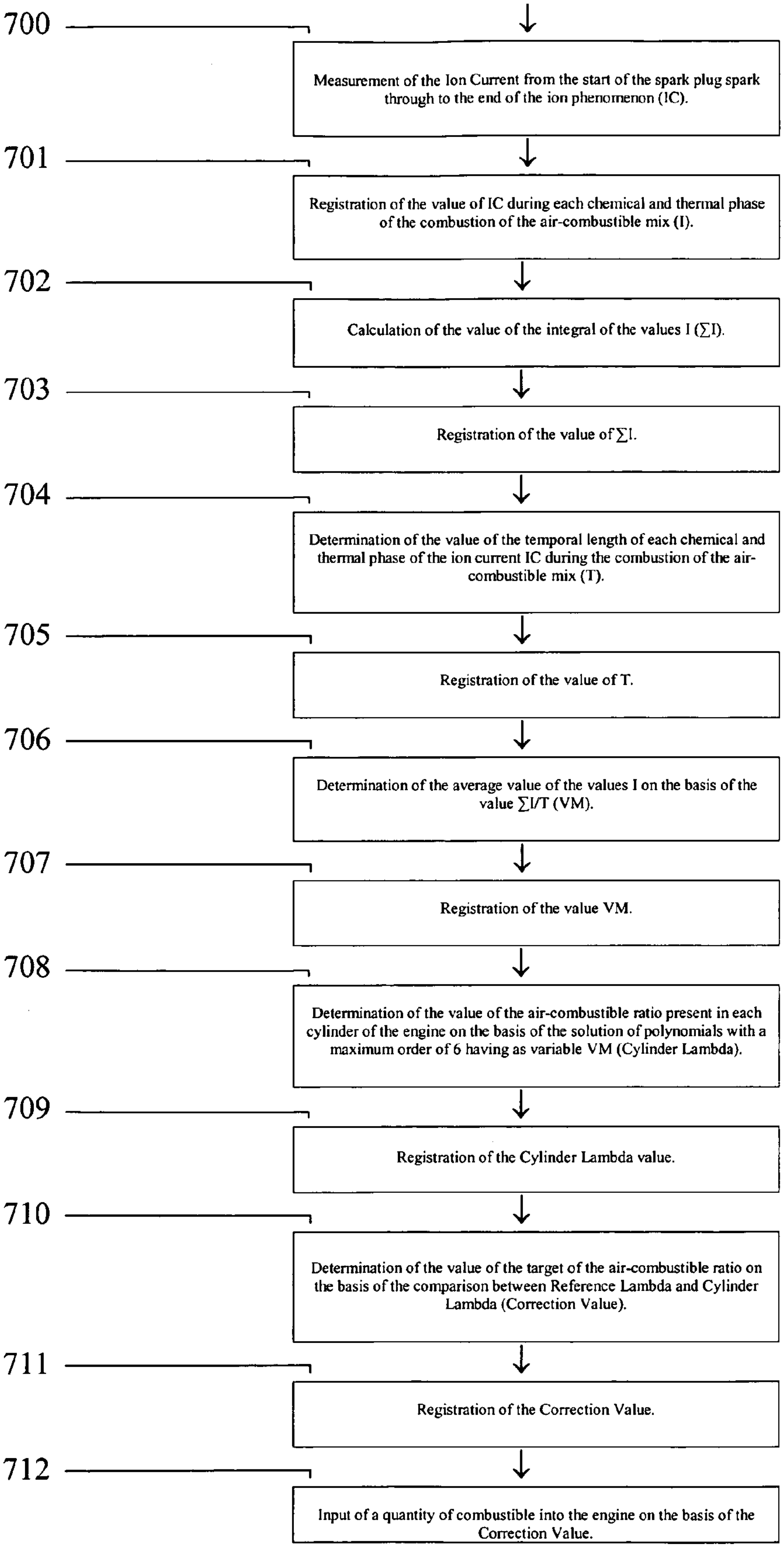

With reference to FIG. 7, said figure indicates a flow chart which schematically illustrates a further embodiment. This method develops over various phases, which are repeated for each cycle of the engine (1) to which the respective means correspond, said means, as mentioned earlier, being preferably stored in the Control Unit (8):

a) the phase (700) of measurement, in each cylinder (2), from the beginning of the spark occurring in the spark plug (5) through to the end of the ion phenomenon of the ion current, present in at least one of the cylinders (2), by the circuits (6) and (7), combined with the coil (4) and the spark plug (5), being said current present solely in the cylinder or cylinders where the combustion has occurred. After the measurement of said ion current (IC), there is:

b) the phase (701) of registration of the values of said ion current IC in each cylinder (2) during each chemical and thermal phase of the combustion of the air-fuel mixture (I) present in cylinders (2), there is:

c) the phase (702) of calculation of the value of the integral of said registered values I in phase 701 (ΣI);

d) the phase (703) of registration of the value of said integral ΣI, calculated in phase 702;

e) the phase (704) of determination of the value of the temporal length of each chemical and thermal phase of said ion current IC during the combustion of the air-fuel mixture (T) in each cylinder (2) of said engine (1);

f) the phase (705) of registration of said value of temporal length T, determined in phase 704;

g) the phase (706) of determination of the average value of the ion current IC in each chemical and thermal phase of the combustion of the air-fuel mixture I in each cylinder (2) of said engine (1) on the basis of the ratio of the value of said integral ΣI and of the value of said temporal length T (VM);

h) the phase (707) of registration of said average value VM, determined in phase 706;

i) the phase (708) of determination of said Cylinder Lambda value on the basis of the solution of polynomials with a maximum order of 6, known by the person expert in the field, having said polynomials as variable the value VM, registered in phase 707;

j) the phase (709) of registration of said Cylinder Lambda value being the value of said solution constitutes a value correlated to said Cylinder Lambda value;

k) the phase (710) regarding the determination of said Correction Value, said value being determined by comparing said Cylinder Lambda value, registered in the phase 709, with said Reference Lambda value, preferably stored in the Control Unit (8);

l) the phase (711) of registration of said Correction Value;

m) the phase (712) of input of a quantity of fuel into each cylinder (2) of said engine (1) on the basis of said Correction Value registered in phase 711.

Figure 8:
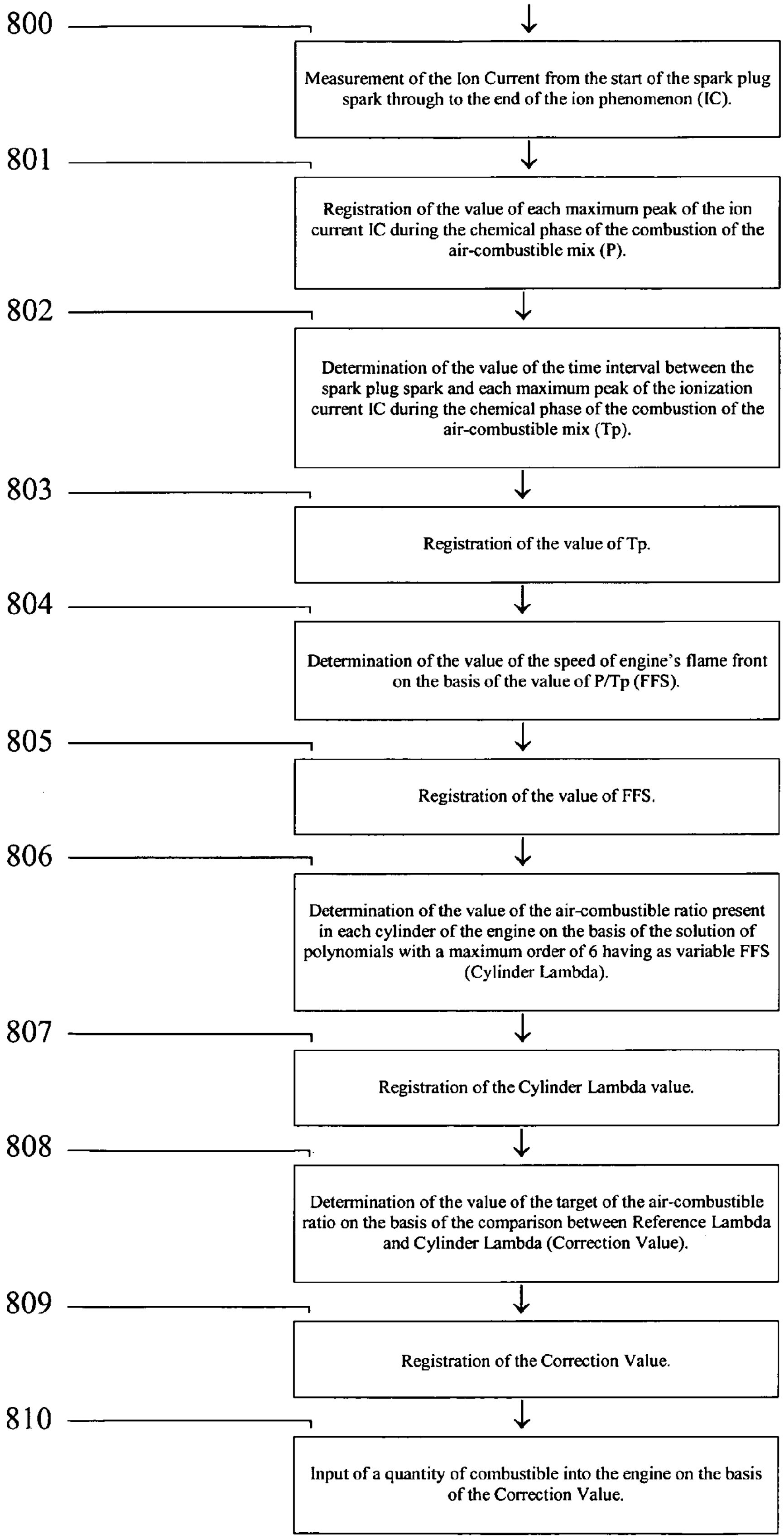

With reference to FIG. 8, said figure indicates a flow chart which schematically illustrates a further embodiment. This method develops over various phases, which are repeated for each cycle of the engine (1) and to which the respective means correspond, preferably stored in the Control Unit (8):

a) the phase (800) of measurement, in each cylinder, from the beginning of the spark occurring in the spark plug (5)

through to the end of the ion phenomenon, of the ion current, present in at least one of the cylinders (2) by the circuits (6) and (7), combined with the coil (4) and the spark plug (5), being said current present solely in the cylinder or cylinders where the combustion has occurred. After the measurement of said ion current (IC), there is:

b) the phase (801) of registration of the value of each maximum peak of said ion current IC during each chemical phase of the combustion of the air-fuel mixture (P) in each cylinder (2). After said value of each maximum peak P has been registered, there is:

c) the phase (802) of determination of the value of the interval of time between the spark occurring in the spark plug (5) and each maximum peak of the ion current during the chemical phase of the combustion of the air-fuel mixture, registered in phase 801 (Tp);

d) the phase (803) of registration of the value of said time interval Tp determined in phase 802;

e) the phase (804) of determination of the value of flame front speed of the engine (1) on the basis of the ratio between said maximum peak value P, registered in phase 801, and said time interval value Tp, registered in phase 803 (FFS);

f) the phase (805) of registration of said value of flame front speed FFS;

g) the phase (806) of determination of said Cylinder Lambda value on the basis of the value of the solution of polynomials with a maximum order of 6, known by the person expert in the field, having said polynomials as the variable the value FFS, registered in phase 805, being the value of said solution constitutes a value correlated to said Cylinder Lambda value;

h) the phase (807) of registration of said Cylinder Lambda value determined in phase 806;

i) the phase (808) of determination of said Correction Value, comparing said Cylinder Lambda value, registered in phase 807, with said Reference Lambda value, preferably stored in the Control Unit (8);

j) the phase (809) of registration of said Correction Value;

k) the phase (810) of input of a quantity of fuel into each cylinder (2) of said engine (1) on the basis of said Correction Value registered in phase 809.

Figure 9:
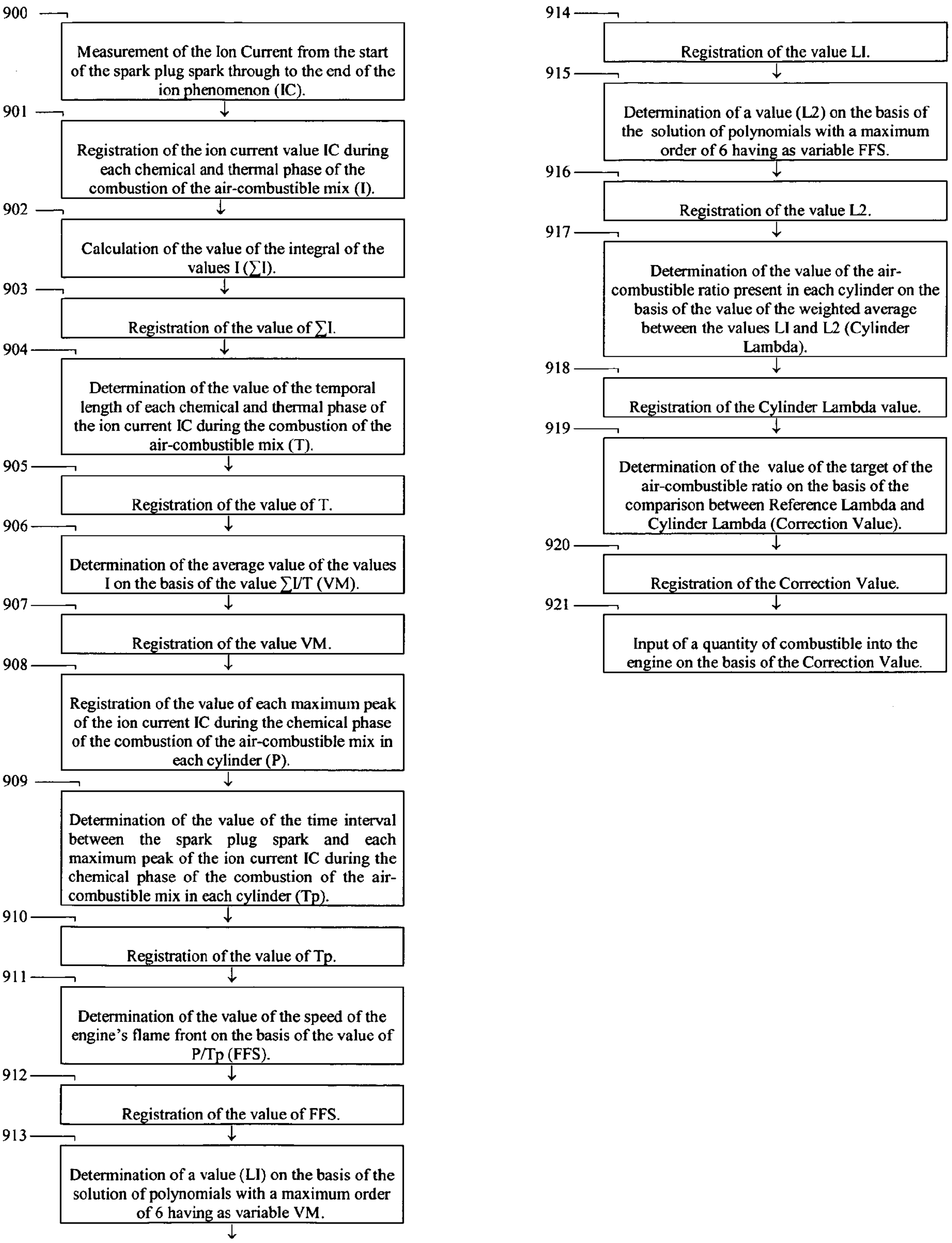

With reference to FIG. 9, said figure indicates a flow chart which schematically illustrates a further embodiment. This method develops over various phases, which are repeated for each cycle of the engine (1) and to which the respective means correspond, preferably stored in the Control Unit (8):

a) the phase (900) of measurement, in each cylinder (2), from the beginning of the spark occurring in the spark plug (5) through to the end of the ion phenomenon, of the ion current, present in at least one of the cylinders (2), by circuits (6) and (7), combined with the coil (4) and the spark plug (5), being said current present solely in the cylinder or cylinders where the combustion has occurred. After the measurement of said ion current (IC), there is:

b) the phase (901) of registration of the values of said ion current IC during each chemical and thermal phase of the combustion of the air-fuel mixture (I) in each cylinder of said engine (1), there is:

c) the phase (902) of calculation of the value of the integral of said values I registered in phase 901 (ΣI);

d) the phase (903) of registration of the value of said integral ΣI, calculated in phase 902;

e) the phase (904) of determination of the value of the temporal length of each chemical and thermal phase of said ion current IC during the combustion of the air-fuel mixture (T) in each cylinder (2) of said engine (1);

(f) the phase (905) of registration of the value of said length T, determined in phase 904;

g) the phase (906) of determination the average value of the ion current IC in each chemical and thermal phase of the combustion of the air-fuel mixture I in each cylinder (2) of said engine (1) on the basis of the ratio of the registered value of said integral ΣI and of the value registered of said temporal length T (VM);

h) the phase (907) of registration of said average value VM, determined in phase 906;

i) the phase (908) of registration of the value of each maximum peak of said ion current IC during each chemical phase of the combustion of the air-fuel mixture (P), there is:

j) the phase (909) of determination of the value of the interval of time between the spark occurring in the spark plug (5) and each maximum peak of the ion current during the chemical phase of the combustion of the air-fuel mixture, registered in phase 908 (Tp);

k) the phase (910) of registration of the value of said time interval Tp determined in phase 909;

l) the phase (911) of determination of speed value of the flame front of said engine (1) on the basis of the ratio between said maximum peak value P and said time interval value Tp (FFS);

m) the phase (912) of registration of the value of said speed of the flame front FFS, determined in the phase 911;

n) the phase (913) of determination of a value (L1) on the basis of the value of the solution of polynomials with a maximum order of 6, known by the person expert in the field, having as variable said average value VM, registered in phase 907;

o) the phase (914) of registration of said average value L1, determined in phase 913;

p) the phase (915) of determination of a value (L2) on the basis of the value of the solution of polynomials with a maximum order of 6, known by the person expert in the field, having as variable is the value of said speed of the flame front FFS, registered in phase 912;

q) the phase (916) of registration of said value L2;

r) the phase (917) of determination of said Cylinder Lambda value on the basis of the value of the weighted average between said value L1, registered in phase 914, and said value L2, registered in phase 916, being the value of said solution constitutes a value correlated to said Cylinder Lambda value;

s) the phase (918) of registration of said Cylinder Lambda value determined in phase 917;

t) the phase (919), of determination of said Correction Value, comparing said Cylinder Lambda value, registered in phase 918, with said Reference Lambda value, preferably stored in the Control Unit (8);

u) the phase (920) of registration of said Correction Value;

v) the phase (921) of the input of a quantity of fuel into each cylinder (2) of said engine (1) on the basis of said Correction Value registered in phase 920.

The invention claimed is:

1. A method for determining and putting in a quantity of fuel on the basis of a value of the target of the air-fuel ratio in an internal combustion engine equipped with a plurality of cylinders and injectors having a Control Unit and a device for each cylinder including a coil, a spark plug, a polarisation circuit, and an acquisition circuit; the method comprising:

measuring, in each cylinder of said engine, the ion current of the combustion of the air-fuel mixture (IC), from the beginning of the spark occurring in said spark plug through to the end of the ion phenomenon;

registering the values of said ion current IC during each chemical and thermal phase of the combustion of the air-fuel mixture in each cylinder of said engine;

calculating the value of the integral of the registered values of said ion current IC during each chemical and thermal phase of the combustion of the air-fuel mixture (ΣI) in each cylinder of said engine;

registering the value of said integral ΣI;

determining the value of the temporal length of each chemical and thermal phase of said ion current IC during the combustion of the air-fuel mixture (T) in each cylinder of said engine;

registering said value T;

determining the average value of said ion current IC in each chemical and thermal phase of the combustion of the air-fuel mixture in each cylinder of said engine on the basis of the ratio of the registered value of said integral ΣI and of the registered value of said temporal length T (VM);

registering said average value VM;

registering the value of each maximum peak of said ion current IC during the chemical phase of the combustion of the air-fuel mixture (P);

determining the value of the time interval between the spark occurring in said spark plug and each maximum peak of said ion current IC during the chemical phase of the combustion of the air-fuel mixture (Tp);

registering said time interval value Tp;

determining the value of speed of the flame front of said engine on the basis of the ratio between said value P and the value of said time interval Tp (FFS);

registering the value of said speed of the flame front FFS;

determining a value (L1) on the basis of the value of the solution of polynomials with a maximum order of six having as variable said average value VM;

registering said value L1;

determining a value (L2) on the basis of the value of the solution of polynomials with a maximum order of six having as variable the value of the speed of said flame front FFS;

registering said value L2;

determining the value of the air-fuel ratio in each cylinder of said engine (Cylinder lambda) on the basis of the value of the weighted average between said value L1 and said value L2;

registering said Cylinder Lambda value;

determining the value of the target of the air-fuel ratio (Correction Value) comparing said Cylinder lambda value with a predetermined value of the air-fuel ratio (Reference lambda); and registering said Correction Value; to put in a quantity of fuel into each cylinder of said engine on the basis of said Correction Value.

2. A device for determining and putting in a quantity of fuel on the basis of a value target of the air-fuel ratio in an internal combustion engine equipped with a plurality of cylinders and injectors having a Control Unit and a device for each cylinder including a coil, a spark plug, a polarisation circuit, and an acquisition circuit wherein said Control Unit comprises:

means to measure, in each Cylinder of said engine, the ion current of the combustion of the air-fuel mixture (IC), from the start of the spark occurring in said spark plug through to the end of the ion phenomenon;

means to register the values of said ion current IC during each chemical and thermal phase of the combustion of the air-fuel mixture in each cylinder of said engine;

means to calculate the value of the integral of the registered values of said ion current IC during each chemical and thermal phase of the combustion of the air-fuel mixture (ΣI) in each cylinder of said engine;

means to register the value of said integral ΣI;

means to determine the value of the temporal length of each chemical and thermal phase of said ion current IC during the combustion of the air-fuel mixture (T) in each cylinder of said engine;

means to register said value T;

means to determine the average value of said ion current IC in each chemical and thermal phase of the combustion of the air-fuel mixture 1 in each cylinder of said engine on the basis of the ratio of the registered value of said integral ΣI and of the registered value of said temporal length T (VM);

means to register said average value VM;

means to register the value of each maximum peak of said ion current IC during the chemical phase of the combustion of the air-fuel mixture (P);

means to determine the value of the time interval between the spark occurring in said spark plug and each maximum peak of said ion current IC during the chemical phase of the combustion of the air-fuel mixture V (Tp);

means to register said time interval value Tp;

means to determine the value of the speed of the flame front of said engine on the basis of the ratio between said value P and the value of said time interval Tp (FFS);

means to register the value of said sped of the flame front FFS;

means to determine a value (L1) on the basis of the value of the solution of polynomials with a maximum order of six having as variable said average value VM;

means to register said-value L1;

means to determine a value (L2) on the basis of the value of the solution of the polynomials with a maximum order of six having as variable the value of said speed of flame front FFS;

means to register said value L2;

means to determine the value of the air-fuel ratio in each cylinder of said engine (Cylinder Lambda) on the basis of the value of the weighted average between said value L1 and said value L2;

means to register said Cylinder Lambda value;

means to determine the value of the target of the air-fuel ratio (Correction Value) by comparing said Cylinder lambda value with a predetermined value of the air-fuel ratio (Reference Lambda);

means to register said Correction Value; and means to put in a quantity of fuel into each cylinder of said engine on the basis of said Correction Value.

* * * * *